United States Patent [19]

Kimura et al.

[11] Patent Number: 4,862,360
[45] Date of Patent: Aug. 29, 1989

[54] SIGNAL PROCESSING METHOD IN AUTORADIOGRAPHY

[75] Inventors: Tsutomu Kimura; Kazuhiro Hishinuma, both of Kanagawa, Japan

[73] Assignee: Fuji Photo Film Co., Ltd., Kanagawa, Japan

[21] Appl. No.: 568,874

[22] Filed: Jan. 6, 1984

[30] Foreign Application Priority Data

Jan. 8, 1983 [JP] Japan ................................. 58-1341
Jan. 8, 1983 [JP] Japan ................................. 58-1342
Mar. 31, 1983 [JP] Japan ............................... 58-57420

[51] Int. Cl.$^4$ ...................... H04N 1/40; G01N 33/58; C12Q 1/68
[52] U.S. Cl. ................................. 364/413.01; 382/6
[58] Field of Search .................... 364/413, 414; 382/6; 435/76, 77, 6; 436/169, 808; 935/77, 78, 86, 87

[56] References Cited

U.S. PATENT DOCUMENTS

| | | | |
|---|---|---|---|
| Re. 31,847 | 3/1985 | Luckey | 250/327.2 |
| 4,258,264 | 3/1981 | Kotera et al. | 250/459.1 X |
| 4,302,204 | 11/1981 | Wahl | 436/501 |
| 4,315,318 | 2/1982 | Kato et al. | 364/414 X |
| 4,320,415 | 3/1982 | Jones | 358/105 |
| 4,389,670 | 6/1983 | Davidson et al. | 358/111 |
| 4,496,973 | 1/1985 | Horikawa et al. | 358/111 |
| 4,526,865 | 7/1985 | Silman | 435/35 |
| 4,617,468 | 10/1986 | Shiraishi et al. | 250/484.1 |
| 4,717,653 | 1/1988 | Webster | 435/6 X |

OTHER PUBLICATIONS

F. Sanger et al., "DNA Sequencing with Chain-Terminating Inhibitors" Proc. Natl. Acad. Sci. U.S.A., vol. 74, No. 12, pp. 5463–5467, Dec. 1977–Biochem.

L. Smith et al., "Fluorescence Detection in Automated DNA Sequence Analysis", Nature, vol. 321, Jun. 12, 1986, pp. 674–679.

Primary Examiner—Jerry Smith
Assistant Examiner—Charles B. Meyer
Attorney, Agent, or Firm—Gerald J. Ferguson, Jr.

[57] ABSTRACT

A signal processing method in autoradiography for determines of the base sequence of DNA or a DNA fragment, by employing groups of radioactively labeled base specific cleavage products or mixtures thereof obtained by specifically cleaving the DNA or DNA fragment labeled with a radioactive element and resolved one-dimensionally in parallel relation to each other to form resolved rows on a support medium. An autograph is obtained having locational information on groups of radioactively labeled cleavage products contained in the rows on the support medium. An electrical digital signal corresponding to the autoradiograph is then generated. Sampling points in each resolved row of the digital signal are next detected. Reference sampling points are then determined in a plurality of reference rows which are either directly provided on the support medium and/or synthesized from certain resolved rows. Corresponding reference sampling points in the plural reference rows are joined to generate plural continuous lines comprising straight lines, polygonal lines or curved lines. Sampling points in the remaining non-reference rows are identified by comparison with the continuous lines to thus determine the base sequence of the DNA or DNA fragment.

12 Claims, 3 Drawing Sheets

SIGNAL PROCESSING METHOD IN AUTORADIOGRAPHY

BACKGROUND OF THE INVENTION

1. Field of the Invention

This invention relates to a signal processing method in autoradiography and more particularly, to a signal processing method of comparing and identifying the resolved positions of radioactively labeled substances in autoradiography for determination of base sequences of DNA employing a radiosensitive material.

2. Description of the Prior Art

Autoradiography has been known as a method for obtaining locational information on radioactively labeled substances distributed in at least one dimensional direction to form a row on a support medium.

For instance, autoradiography comprises steps of: labeling organism-originating biopolymers such as proteins or nucleic acids with a radioactive element; resolving the radioactively labeled biopolymers, derivatives thereof, or cleavage products thereof (hereinafter referred to as radioactively labeled substances) on a gel support (support medium) through a resolving process such as electrophoresis to form a resolved pattern of the radioactively labeled substances (the resolved pattern is not visible); placing said support medium and a high-sensitivity type X-ray film together in layers for a certain period of time to expose the film and developing said film to obtain the autoradiograph of the resolved pattern as a visible image on the film; and obtaining the locational information of the radioactively labeled substances from said visible image. Further, the identification of the polymeric substances, determination of molecular weight of the polymeric substances and isolation of the polymeric substances are performed based on the obtained locational information.

The autoradiography has been effectively utilized for determining the base sequence of nucleic acids such as DNA (or DNA fragments, herein "DNA" may be used to include DNA as well as DNA fragments or the like.

The Maxam-Gilbert method and Sanger-Coulson method are known as methods for sequencing DNA utilizing autoradiography. In these methods, the base sequence of DNA is determined by utilizing the characteristic structure of DNA in that DNA is in the form of double helix structure consisting of two chain molecules, which are constituted by four constitutional base units, each unit having a base, namely adenine (A), guanine(G), thymine (T) or cytosine (C), and cross-linked by hydrogen bonding between the four bases, the hydrogen bonding between each constitutional base unit comprising only two combinations namely G-C and A-T.

For instance, the Maxam-Gilbert method is carried out as follows: A group containing a radioactive isotope of phosphorus (P) is attached to a chain molecule of DNA or a DNA fragment at one end to be sequenced to prepare a radioactively labeled DNA molecule, and then the thus labeled DNA molecule is specifically cleaved at the constitutional base units by a certain chemical reactions. This reaction is called a "base specific cleavage reaction". Then the obtained mixture of numerous cleavage products of the DNA or DNA fragment is resolved through gel electrophoresis to give a resolved pattern of the numerous cleavage products (the pattern is not visible). An X-ray film is exposed to the resolved pattern and developed to obtain a visualized autoradiograph thereon, and the sequential position of each base from the radioisotopically labeled end of the chain molecules is read by referring to the obtained autoradiograph and the applied base specific chemical reaction so as to determine the sequence of all bases in the DNA.

In the autoradiography utilizing the radiographic process, the visualization of the autoradiograph having the locational information on radioactively labeled substances on a radiographic film is essentially required. Investigators analyzes the distribution of the radioactively labeled substances on a support medium through observation of the visualized autoradiograph. The sequence of DNA is determined by judging individual resolved positions of the radioactively labeled cleavage products (or mixture of cleavage products) of DNA on the visualized autoradiograph, and then comparing the resolved positions among the resolved rows thereof.

Since the autoradiography requires the visual analysis of the autoradiography, there is a drawback in that the locational information on the radioactively labeled substances obtained by analysis of the visualized autoradiograph varies or fluctuates depending on the skill of investigators, and the accuracy of the information is limited to a certain extent. Particularly, in such cases that the autoradiograph visualized on a radiographic film shows an image of reduced quality (in regard to sharpness, contrast, etc.), satisfactory information can be hardly obtained and the accuracy is low. In order to improve the accuracy of the locational information, for instance, a visualized autoradiography has been scanned with a device such as a scanning densitometer. However, such scanning process requires increased operation time and complicated procedures. Further, there is a limitation on increase of the accuracy when using this device.

For instance, in carrying out the exposing procedure, the support medium carrying the above-mentioned resolved rows thereon and a radiographic film sometimes cannot be accurately arranged together in layers. In such a case, the resolved rows (e.g., electrophoretic rows) visualized on the radiographic film are rendered not parallel to the longitudinal direction of the film to give a dislocated pattern. As a result, error is introduced into the visual analysis of the locational information on the radioactively labeled substances to decrease the accuracy thereof.

Further, the rows of the resolved radioactively labeled substances on the support medium are sometimes made non-parallel to the longitudinal direction of the support medium or made distorted depending on the nature of the support medium or resolving conditions. For instance, a gel support medium is generally held between two glass plates in the resolving procedure because the gel lacks self-supporting property. As a result, the gel occasionally becomes uneven in thickness due to the deformation of the covers such as the glass plates and accordingly the radioactively labeled substances are not always resolved uniformly on the gel. The lack of uniformity of the resolved pattern is also caused by air foams contained in the gel or by heterogenous dispersion of the composition of the gel. For these reasons, phenomenon such as the so-called smiling effect, i.e., a phenomenon that the migration distance of the resolved row in the vicinity of the center of the support medium is longer than those in the both sides thereof, is often observed. Additionally, if the voltage is not applied uniformly to the support medium in the electrophoresis, the resolving conditions are made locally uneven on the suppor to to distort the resolved rows.

There is known no suitable method but a method of manually correcting the distortion of resolved rows. Accordingly, it is not easy to analyze the locational information on the radioactively labeled substances in the above-described cases. Even if the aforementioned device is used, it is still difficult to obtain satisfactorily accurate locational information on the radioactively labeled substances.

SUMMARY OF THE INVENTION

The present inventors have discovered that the base sequence of DNA or DNA fragment is easily and accurately determined by a signal processing method. Said signal processing method comprises steps of obtaining a digital signal corresponding to the autoradiograph visualized on a radiosensitive material, which has information on the one dimensional location of the radioactively labeled substances in a sample, and subsequently processing the digital signal.

The present invention provides a signal processing method in autoradiography for determination of base sequence of DNA or DNA fragment, employing radioactively labeled cleavage products obtained by specifically cleaving the DNA or DNA fragment labeled with a radioactive element, comprising the steps of:

(1) providing at least two sets of reference mixtures each consisting essentially of guanine specific cleavage products, adenine specific cleavage products, thymine specific cleavage products and cytosine specific cleavage products; and (2) providing at least one group of cleavage products or mixture thereof containing at least one kind of the base specific cleavage products, (3) resolving the reference mixtures provided in step (1) and the product group provided in step (2) one-dimensionally in such parallel relation that the resolved rows of said two sets of reference mixtures (1) sandwich at least one resolved row of the group (2) to form at least three resolved rows on a support medium, (4) obtaining an autoradiograph having locational information on groups of radioactively labeled cleavage products contained in said rows on the support medium;

(5) generating an electrical digital signal corresponding to said autoradiograph including said rows;

(6) detecting reference sampling points in each resolved reference row of the digital signal, the reference row being the resolved row of the reference mixture;

(7) detecting sampling points in said one resolved row other than the reference rows;

(8) joining corresponding reference sampling points in said reference rows to generate plural continuous lines comprising straight lines, polygonal lines or curved lines; and (9) identifying said sampling points in said one resolved row other than the reference rows by comparison with said continuous lines.

The present invention also provides a signal processing method in autoradiography in which all the above sets of reference mixtures (1) of DNA or a DNA fragment are replaced with sets of specimens for synthesizing a reference row, each set comprising at least two groups of cleavage products or a mixture thereof and the groups being in such combination as to totally contain guanine specific cleavage products, adenine specific cleavage products, thymine specific cleavage products and cytosine specific cleavage products; and each reference row is synthesized from resolved rows of the specimens through the signal processing.

Further, the present invention provides a signal processing method which is in combination of the above-mentioned two methods, that is, using at least one set of the reference mixture and at least one set of the specimens for synthesizing a reference row, the reference rows for the signal processing consist essentially of the resolved row of the reference mixture and the synthesized row from resolved rows of the specimens.

In the present invention, the reference row means a row corresponding to a resolved row of a mixture of all the cleavage products consising essentially of guanine specific cleavage products, adenine specific cleavage products, thymine specific cleavage products and cytosine specific cleavage products, and is employed as an internal reference for each resolved row of radioactively labeled base specific cleavage products in the signal processing for determination of the base sequence of DNA or a DNA fragment.

DETAILED DESCRIPTION OF THE INVENTION

In the present invention, the term "locational information" of the radioactively labeled substances (or products) means to include a variety of information relating to the location of the radioactively labeled substances, or the aggregation thereof, being present in the sample, such as the location, the shape, the concentration, the distribution, and combinations thereof.

According to the present invention, the base sequence of DNA or DNA fragment can be determined with high accuracy, even if there occurs the distortion or dislocation in the overall length of the autoradiograph recorded on the radiosensitive material due to the locational distortion of resolved rows of the radioactively labeled substances on the support medium occurring in the course of the resolving procedure, or due to the locational distoration occurring between the support medium on which the resolved rows thereof are formed in one dimensional direction and the radiosensitive material in the course of the recording procedure of the autoradiograph. Particularly in the case that the distortion is observed in the resolving direction, the present invention makes possible to identify the resolved portions through determination of a level of the distortion on the digital image data with reference to a certain reference row and subsequent correction on respective resolved rows, by providing plural reference rows (internal references) in the signal processing. A portion or all of the plural reference rows can be obtained by providing resolved rows of the reference mixtures on the support medium and/or by synthesizing from resolved rows of specimens for synthesizing a reference row. Thus, the base sequence of DNA can be determined smoothly and with high accuracy. More in detail, reference sampling points in the reference row (internal reference) can be obtained with high accuracy in the case of using a set of the reference mixtures and providing the resolved row thereof on the support medium. On the other hand, in the case of using a set of specimens for synthesizing a reference row and synthesizing the reference row through the signal processing, the reference sampling points in the reference row can be obtained without unnecessary increase of the number of resolved rows on the support medium because the specimen also serves as a set of substances for determination of the base sequence.

Accordingly, it is possible to achieve the DNA sequencing not only with high accuracy due to the provision of precise reference rows but also with the increased amount of information in one autoradiographic process, especially in the case of using the combination of the reference mixture and the specimens for synthesizing a reference row. When three or more reference rows are utilized in the signal processing, the reference rows may be obtained in an optional combination of the reference mixture and the specimen for synthesizing a reference row.

Furthermore, it is possible to detect the resolved positions of the radioacitively labeled substances with high accuracy even if the area of the individual resolved portion thereof is small. This means that the absolute amount of the radioactively labeled substances used in one autoradiographic process can be reduced. Accordingly, the number of resolved rows providable on a single support medium can increase without broadening the width of the support medium to give more information than in the case using the conventional autoradiographic process.

Examples of the sample employable in the present invention include a support medium on which base specific cleavage products and/or a mixture thereof, obtained by base-specificially cleaving DNA or a DNA fragment labelled with a radioactive element are resolved (or developed) in one dimensional direction to form resolved rows.

Representative examples of the method for resolving (or developing) the above-mentioned radioactively labeled substances on a support medium include an electrophoresis using one of various resolving mediums such as a gel in the form of layer, column or the like, a molded polymer film such as a cellulose diacetate film, a filter paper, and a thin paper chromatography using a support of material such as silica gel. Among these, the electrophoresis using a gel support medium is preferrably employed in the present invention.

The radiosensitive material used in the present invention has a basic structure comprising a support and a radiographic (photographic) emulsion layer. The radiographic emulsion layer comprises a binder such as gelatin and silver halide dispersed therein. For instance, the radiosensitive material is prepared by providing the above-mentioned emulsion layer onto the transparent support such as a polyethylene terephthalate sheet. A representative example of the radiosensitive material includes a radiographic film such as a high-speed type X-ray film.

In carrying out the exposing procedure, that is, the procedure of exposing the radiosensitive material to the radiation emitted from the support medium containing the radioactively labeled substances, at least a portion of the emitted radiation is absorbed in the radiosensitive substance in the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. for at least several days, and then the radiosensitive material is developed. In the exposing procedure, it is further possible to enhance the radiographic speed of the radiosensitive material by using a radiographic intensifying screen or applying thereto a preliminary exposure such as flash exposure.

The exposing procedure of the radiosensitive material to a sample and the developing procedure thereof in the autoradiographic process are well known, and are described for instance in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

A method for reading out or detecting the autoradiograph having the information on the dimensional location of the radioactively labeled substances in the sample recorded on the radiosensitive material according to the invention will be described briefly, referring to an embodiment of a read-out system shown in FIG. 1 of the accompanying drawings.

Figure 1:
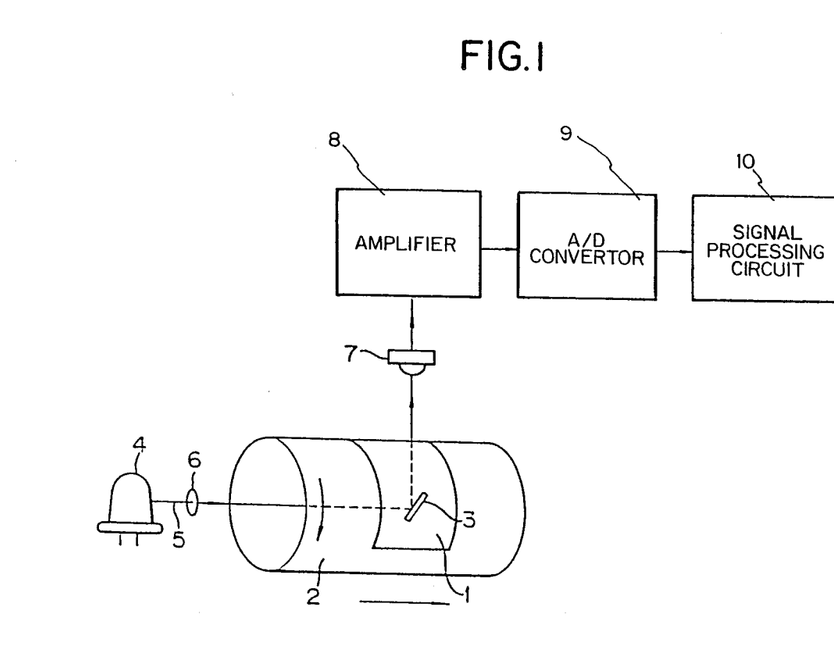
FIG. 1 shows an example of the read-out system for reading out an autoradiograph having locational information of the radioactively labeled substances in the sample recorded on a radiosensitive material employable in the present invention.

FIG. 1 schematically illustrates an embodiment of the read-out system for reading out the autoradiograph having one dimensional information on the location of the radioactively labeled substances, which is recorded in the form of a visual image on a radiosensitive material 1.

The radiosensitive material 1 on which the visual image is recorded is mounted on a transparent and hollow drum 2. The drum 2 is moved in the axial direction at a certain speed as well as rotated about its axis at a certain angular velocity and a mirror 3 is fixed on the hollow drum 2. A light beam 5 generated by a light source 4 passes through a lens 6 and enters the drum 2. The light beam is then reflected in the upper direction by the mirror 3 and passes through the radiosensitive material 1 mounted on the transparent drum 2. Thus, the radiosensitive material 1 is spot-scanned with the light beam in the X-Y scanning mode.

The light beam passing through each position of the radiosensitive material 1 is received by a light detector 7 and converted by an electric signal, which is amplified by an amplifier 8 and converted to a digital signal through an A/D converter 9.

More in detail, the read-out procedure is described in Japanese Patent Provisional Publications No. 54(1979)-121043.

In the above descripiton on the method for reading out the autoradiograph having the locational information on the radioactively labeled substances recorded on the radiosensitive material, a read-out procedure utilizes the light transmission method using a light beam, but the light reflection method can be also applied thereto. Further, the read-out procedure is by no means restricted to the above-mentioned embodiment, but other various methods such as a read-out procedure using a TV camera can be utilized.

The thus obtained digital signal corresponding to the autoradiograph of the sample is subsequently input into the signal processing circuit 10. In the signal processing circuit 10, the information on one dimensional location of the radioactively labeled substances is processed and then represented with symbols and/or numerals so as to determine the sequence of aimed DNA.

The signal processing method of the present invention for the determination of base sequence of DNA is described below, utilizing the above-mentioned Maxam-Gilbert method and referring to an example using the combination of a reference mixture containing all the base specific cleavage products and specimens for synthesizing reference rows from two groups each containing all the base specific cleavage products. The example comprises the following five groups of base specific cleavage products for three kinds of DNA resolved on a support medium through the electrophoresis, which are a typical combination of cleavage product groups:

(1) guanine (G) specific cleavage products
  + adenine (A) specific cleavage products
  + thymine (T) specific cleavage products
  + cytosine (C) specific cleavage products,
(2) guanine (G) specific cleavage products
  + adenine (A) specific cleavage products,
(3) thymine (T) specific cleavage products
  + cytosine (C) specific cleavage products,
(4) guanine (G) specific cleavage products,
(5) cytosine (C) specific cleavage products.

The three kinds of DNA labeled with a radioactive element ($^{32}P$) are specifically cleaved at the constitutional base units according to the conventional manner respectively to prepare three sets of the above groups (1) to (5) of base specific cleavage products. However, it is enough to prepare at least one set of the reference mixture (1) in this combination. The prepared three sets of the five groups of radioactively labeled cleavage products are respectively resolved on a gel support medium through electrophoresis to obtain a sample, which is performed in such a manner that a resolved row of the reference mixture (1) and two resolved rows of the two groups (2) and (3) consisting essentially of the mixture of cleavage products (namely, a specimen set for synthesizing a reference row) sandwich resolved rows of at least the two groups (4) and (5) of base specific cleavage products.

Then, the sample (support medium on which the resolved rows are formed) is placed on a radiosensitive material together in layers at a low temperature ranging from −70° C. to −90° C. for several days to perform the exposure, and the autoradiograph of the sample is recorded on the radiosensitive material.

Figure 2:
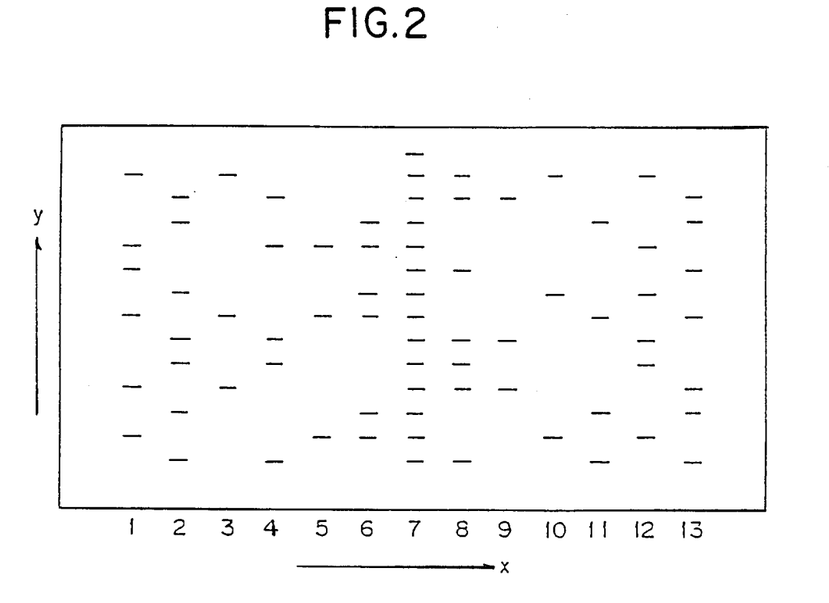
FIG. 2 shows an example of an autoradiograph of resolved rows comprising base specific cleavage products of DNA.

FIG. 2 shows an autoradiograph of resolved rows (electrophretic rows) comprising the above-mentioned five groups of the radioactively labeled cleavage products for the three kinds of DNA. That is, the first to thirteenth rows (electrophoretic rows) shown in FIG. 2 in order correspond to, (1) − (G) specific cleavage products
  + (A) specific cleavage products,
(2) − (T) specific cleavage products
  + (C) specific cleavage products,
(3) − (G) specific cleavage products,
(4) − (C) specific cleavage products,
(5) − (G) specific cleavage products,
(6) − (G) specific cleavage products
  + (A) specific cleavage products,
(7) − (G) specific cleavage products
  + (A) specific cleavage products
  + (T) specific cleavage products
  + (C) specific cleavage products,
(8) − (T) specific cleavage products
  + (C) specific cleavage products,
(9) − (C) specific cleavage products,
(10) − (G) specific cleavage products,
(11) − (C) specific cleavage products,
(12) − (G) specific cleavage products
  + (A) specific cleavage products, and
(13) − (T) specific cleavage products
  + (C) specific cleavage products.

The 1st or 4th rows, the 5th to 9th rows, and the 10th to 13th rows are groups of resolved rows of different DNA, respectively. The 7th row is of the reference mixture; and the 1st and 2nd rows and the 12th and 13th rows are of the specimens for synthesizing the reference rows, respectively.

The digital signal obtained by reading out the autoradiograph recorded on the radiosensitive material by means of the read-out system shown in FIG. 1 is provided with an address (X, Y) which is represented by a coordinate system fixed to the radiosensitive material and with a level of signal (Z) in its address which corresponds to the amount of transmitting light. That is, the obtained digital signal corresponds to the autoradiograph shown in FIG. 2 and digital image data having the locational information on the above-mentioned radioactively labeled substances are input into the signal processing circuit 10. In the present invention, the digital image data mean a set of the digital signals corresponding to the autoradiograph of the radioactively labeled substances.

In the first place, resolved positions of the radioactively labeled substances are detected on the above-mentioned 13 rows on the digital image data, and the detected resolved positions are assigned to sampling points. For example, the sampling points are detected as follows.

The digital image data are scanned at two different positions in parallel and in such a manner that the scanning traverses the one-dimensionally distributed (resolved) row of the radioacitively labeled substances to detect distribution points thereof in each row on each scanning (this scanning for detecting the distribution points is referred to as preliminary scanning); and the two distribution points for each row are joined to give thirteen straight lines, and the straight lines are assigned to scanning lines for detecting the sampling points in each resolved row.

In the signal processing method of the present invention, the obtained digital signal is temporarily stored in a memory device of the signal processing circuit 10 (that is, a non-volatile memory unit such as a buffer memory, a magnetic disk, etc.). In the signal processing, the scanning on the digital image data means to selectively pick up only the signal in the scanning area from the memory device.

Then, the scanning with the scanning line for detecting sampling points is performed on the digital image data to obtain a function f(W) which represents the signal level on the scanning area, wherein W represents the position on the scanning line. Smoothing is applied to the function f(W) through convolution with a suitable filter function and the like, to obtain a function g(W). Subsequently threshold-processing is applied to the function g(W). That is, the function g(W) is converted into a continuous function having only 1 and 0 values by the operation:

$$g(W) = 1 \text{ for } g(W) \geq \alpha_0$$

$$g(W) = 0 \text{ for } g(W) < \alpha_0$$

wherein $\alpha_0$ is a threshold value.

All middle points of regions of $g(W)=1$ in the function $g(W)$ are assigned to sampling points. The threshold value ($\alpha_0$) employed in the threshold processing can be determined, for instance, based on a relationship between the signal levels and the frequency of occurrence thereof with respect to the digital signal in the scanning area, namely by employing a histogram.

Thus, a set of the sampling points $\{S_{kn} (X_{kn}, Y_{kn}, Z_{kn})\}$ can be detected for each row, wherein k is a positive integer and represents the number of row; and n is a positive integer and represents the number of the sampling point. The sampling point $S_{kn}$ means the n-th sampling point in the k-th row. The process for detecting the sampling points is by no means restricted to the above-described process.

In the second place, by performing a logical sum operation between the sampling points in the first row and the sampling points in the second row, a row composed of sampling points for all four base specific cleavage products which consist essentially of (G) specific cleavage products, (A) specific cleavage products, (T) specific cleavage products and (C) specific cleavage products, namely a reference row (internal reference row) of $\{S_{14n}\}$ may be obtained. This synthesis is, for instance, represented by the following operation:

$$\{S_{14n}\} = \{S_{1n}\} U \{S_{2n}\}$$

wherein $\{\ \}$ represents a set of sampling points and U represents a logical sum operator. The reference sampling set $\{S_{14n}\}$ is fixed at such a new coordinate that the synthesized reference row imaginarily exist between the first row and second row.

A reference row having reference sampling points $\{S_{15n}\}$ is synthetically obtained by the above-mentioned operation between the sampling points in the twelfth row and the sampling points in the thirteenth row.

The seventh row is a resolved row of the reference mixture (i.e., reference row) and the sampling points thereof are reference sampling points. Accordingly, there are provided three reference rows (including the imaginary reference rows) on the digital image data; one in the center and two in the respective sides of the thirteen electrophoretic rows obtained by resolution.

In the third place, a plurality of straight lines (or polygonal lines) are obtained by joining the corresponding reference sampling points in each reference row, or reference sampling points having the same sampling point number n. For instance, the reference sampling points $S_{14,1}$, $S_{7,1}$ and $S_{15,1}$ at the farthest resolved positions (n=1) are joined to obtain a polygonal line, and the other reference sampling points (n=2, 3, . . . ) are subsequently joined in the same manner as mentioned above to obtain straight lines (or polygonal lines) as same as the minimum number of reference sampling points in a reference row. The polygonal lines may be further approximated by a suitable curve. Thus obtained continuous lines comprising straight lines, polygonal lines, and/or curved lines can be considered to be a series of contour lines $\{L_n\}$, wherein n coincides with the reference sampling point number n.

Figure 3:
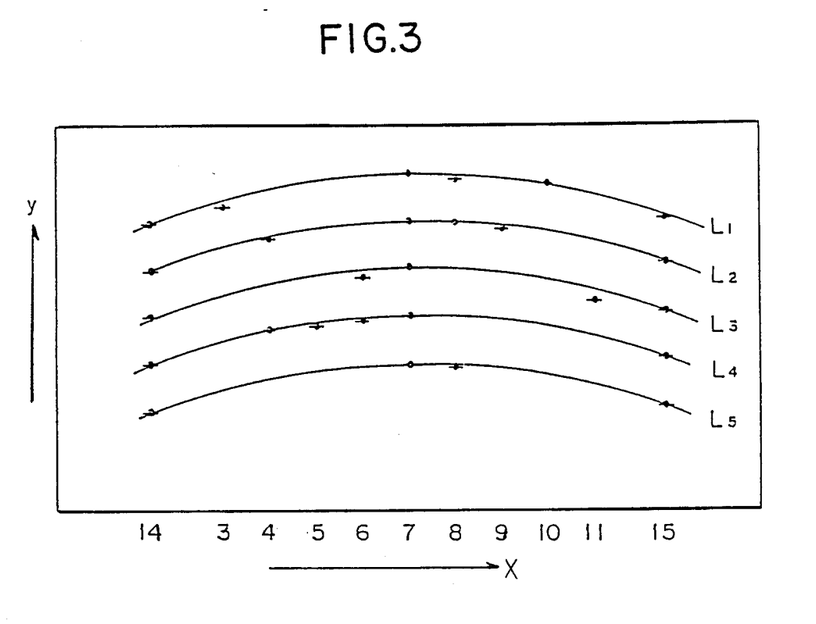
FIG. 3 shows a part of contour lines which are prepared from the reference sampling points and approximated with curved lines.

FIG. 3 shows a part of the contour lines approximated by curves as mentioned above.

In the next place, the sampling points in the other rows than the reference rows are compared and identified with reference to the contour lines. For instance, concerning the sampling point $S_{3,1}$ in the third row, it is determined which of the contour lines $L_1$ or $L_2$ the sampling point $S_{3,1}$ is positioned nearer to, and if the nearer contour line is $L_1$, the sampling point $S_{3,1}$ is assigned to the reference sampling point $S_{14,1}$. All the sampling points in the third row are subsequently assigned to any one of the reference sampling points in the same manner as mentioned above. In summary, the sampling points in the third row are represented by a subset $\{S_{14n}\}_3$ of the reference sampling points or a subset $\{L_n\}_3$ of the contour lines.

Thus the sampling point $S_{kn}$ represented by the X-Y coordinate ($X_{kn}$, $Y_{kn}$) can be also represented by the contour line $L_n$. Since the series of contour lines can be assumed to be the electrophoretic coordinate, the above-mentioned process can be regarded, in other words, to be the coordinate transformation from the X-Y coordinate to the electrophoretic coordinate $L_n$.

A set of sampling points in the third row which are assigned to the reference sampling points is included in a set of sampling points in the first row constituting the reference row, and consequently an imaginary sixteenth row having a new set $\{S_{16,n}\}$ of sampling points is obtained by the logical product operation.

$$\{\widetilde{S_{14n}}\}_3 \cap \{S_{1n}\} = \{S_{16n}\}.$$

The obtained sixteenth row corresponds to a resolved row of adenine specific cleavage products in the groups of the first through fourth rows.

The same operation is performed between the fourth row and the second row to obtain the seventeenth row corresponding to a resolved row of thymine specific cleavage products. Thus, concerning the third, fourth, sixteenth and seventeenth rows, the reference sampling point $S_{14n}$ is compared with the sampling point $S_{kn}$ in an increasing order of n, and when the former coincides with the latter, the reference sampling point $S_{14n}$ is replaced with the coincident sampling point $S_{kn}$. To arrange the reference sampling points in the reference row in an increasing order of n, for instance, the following arrangement can be obtained.

$$S_{3,1}, S_{4,1}, S_{17,1}, S_{3,2}, S_{16,1},$$

Into the above arrangement, $S_{3n}=G$, $S_{4n}=C$, $S_{16n}=A$ and $S_{17n}=T$ are introduced to give the following scheme.

G-C-T-G-A-

Thus, the base sequence of one chain molecule of DNA which has been resolved in the groups of the first through fourth rows is determined.

The same processing is carried out for the fifth through ninth rows and the tenth through thirteenth rows to determine the sequences of one chain molecules of the other two kinds of DNA respectively.

The representation mode of the information on the base sequence of DNA obtained as described hereinbefore is by no means limited to the above-mentioned representation mode, and other representation modes may be utilized optionally. For instance, the relative amount of resolved base specific cleavage products can be also obtained by processing the signal level on the scanning line with an optional operation, if desired.

Further, the base sequence of both chain molecules of DNA can be represented. That is, given the information on the combination between the four bases, namely A-T and G-C, the sequence of DNA is represented by the following scheme.

G-C-G-C-A-A-T-G-C-

C-G-C-G-T-T-A-C-G-

The method for determining the base sequence of DNA utilizing the aforementioned combinations of (G+A, T+C, G, C, G+A+T+C) is an example of the determination of the sequence of DNA, and the signal processing of the present invention is by no means limited to the above combination, but various combinations are employable to determine the sequence of DNA in the same manner as described above.

Whatever combination is utilized, however, the combination is required to have the reference mixtures containing all the base specific cleavage products (G+A+T+C) and/or specimens for synthesizing a reference row totally containing (G, A, T, C). Additionally, it is required that two or more of resolved rows of a set of the specimen for synthesizing a reference row are provided adjacent to each other on the support medium, and that sets of resolved rows for obtaining reference rows (containing a resolved row of the reference mixture) are so provided as to sandwich resolved rows of base specific cleavage products to be sequenced.

The above description is naturally applicable to the cases that all reference rows are provided by reference mixtures, and that all reference rows are provided by synthesis, as well as the case that the reference rows are provided by both the reference mixture and synthesis.

The sets of resolved rows of the mixtures and/or the specimens for synthesizing a reference row are preferably separated from each other as far as possible in order to determine the base sequence of DNA with high accuracy. More in detail, these sets are preferably provided in the both end rows of the plural resolved rows in the case of two sets, and the sets are preferably provided in the both end rows and in the center row in the case of three sets. In the case that more than three sets are involved, these sets are preferably provided independently between resolved rows to be sequence, with a suitable interval. The provision of three or more of sets of resolved rows for obtaining reference rows are effective to determine the sequence of DNA especially when the aforementioned smiling effect is observed on the support medium on which the radioactively labeled substances are resolved. By increasing the number of sets of resolved rows for obtaining reference rows on the support medium, the contour lines obtained by using the reference rows are more precise and the base sequence of DNA can be determined with higher accuracy.

In the case of using the reference mixture, the obtained reference row is more exact than in the case of employing an imaginary reference row obtained by synthesis, because the reference mixture is resolved simultaneously as one row on the support medium, so as to increase the precision of the contour lines.

On the other hand, resolved rows of the specimen for synthesizing a reference row not only are employed to synthesize the reference row, but also serve per se as resolved rows to be sequenced respectively. Therefore, the more the number of resolved rows provided on the support medium is, the more the reference rows can be synthesized so as to obtain the more precise contour lines. Thus, the base sequence can be determined more accurately.

In the above-mentioned example, the present invention is described referring to the thirteen rows of the groups of radioactively labeled cleavage products resolved respectively in one dimensional directions on the support medium, but the resolved rows are by no means restricted to thirteen.

The information on the base sequence of DNA determined through the above-mentioned signal processing is output from the signal processing circuit 10, and subsequently transmitted to a recording device (not shown), directly or optionally via storage in a storing means such as a magnetic tape.

Various recording devices based on various systems can be employed for the above-described purpose, for instance, a device for visualizing optically by scanning on a radiosensitive material with laser beam, etc., a display means for visualizing electrically on CRT, etc., a means for printing a radiation image display on CRT by mean of a video printer, and a means for visualizing on heatsensitive recording material using thermic rays.

It is further possible to perform the genetic philological information processing such as comparison between the obtained base sequence of the DNA and the base sequence of another DNA which has been already recorded and stored in a suitable place.

We claim:

1. A signal processing method in autoradiography for determination of the base sequence of DNA or a DNA fragment, employing radioactively labeled cleavage products obtained by specifically cleaving the DNA or DNA fragment labeled with a radioactive element, comprising the steps of:
   (1) providing at least two sets of reference mixtures each consisting essentially of guanine specific cleavage products, adenine specific cleavage products, thymine specific cleavage products and cytosine specific cleavage products;
   (2) providing at least one group of cleavage products or a mixture thereof containing at least one kind of the base specific cleavage products;
   (3) resolving both the reference mixtures provided in step (1) and the product group provided in step (2) one-dimensionally in such parallel relation that the resolved rows of said two sets of reference mixtures (1) sandwich at least one resolved row of the product group (2) to form at least three resolved rows on a support medium;
   (4) obtaining an autoradiograph having locational information on groups of radioactively labeled cleavage products contained in said rows on the support medium;
   (5) generating an electrical digital signal corresponding to said autoradiograph including said rows;
   (6) detecting reference sampling points in each resolved reference row of the digital signal;
   (7) detecting sampling points in said one resolved row;

(8) joining corresponding reference sampling points in said reference rows to generate plural continuous lines comprising straight lines, polygonal lines or curved lines; and (9) identifying said sampling points in said one resolved row of the product group (2) by comparison of the last-mentioned sampling points with said continuous lines to thus determine said base sequence of said DNA or DNA fragment.

2. The signal processing method in autoradiography as claimed in claim 1, wherein at least three resolved rows of the reference mixture (1) are so provided on the support medium that two resolved rows of the reference mixtures in close relation to each other sandwich at least one resolved row of the product group (2).

3. The signal processing method in autoradiography as claimed in claim 1 or 2, wherein the sampling points are detected by at least smoothing or threshold-processing the digital signal on each scanning line for the resolved rows respectively.

4. The signal processing method in autoradiography as claimed in claim 1 or 2, wherein the employed cleavage products of DN or the DNA fragment comprise at least five groups including:

(1) guanine specific cleavage products and adenine specific cleavage products and thymine specific cleavage products and cytosine specific cleavage products;

(2) base specific cleavage products containing guanine specific cleavage products;

(3) base specific cleavage products containing adenine specific cleavage products;

(4) base specific cleavage products containing thymine specific cleavage products; and (5) base specific cleavage products containing cytosine specific cleavage products.

5. A signal processing method in autoradiography for determining of the base sequence of DNA or a DNA fragment, employing radioactively labeled cleavage products obtained by specifically cleaving the DNA or DNA fragment labeled with a radioactive element, comprising the steps of:

(1) providing at least two sets of specimens for synthesizing a reference row, each set comprising at least two groups of cleavage products or a mixture thereof, where the two groups in combination totally contain guanine specific cleavage products, adenine specific cleavage products, thymine specific cleavage products and cytosine specific cleavage products;

(2) providing at least one group of cleavage products or a mixture thereof containing at least one kind of the base specific cleavage products;

(3) resolving both the two sets of specimens provided in step (1) and the product group provided in step (2) one-dimensionally in such parallel relation that at least a first two resolved rows respectively correspond to a first one of said two groups of cleavage products or mixtures thereof and a second two resolved rows respectively correspond to a second one of said two groups of cleavage products or mixtures thereof where said first two resolved rows and said second two resolved rows sandwich at least one resolved row of the product group (2) to form at least five resolved rows on a support medium;

(4) obtaining an autoradiograph having locational information on groups of radioactively labeled cleavage products contained in said rows on the support medium;

(5) generating an electrical digital signal corresponding to said autoradiograph including said rows;

(6) detecting sampling points in each resolved row of the digital signal;

(7) synthesizing at least two reference rows respectively from said first two resolved rows and said second resolved two rows and determining reference sampling points in said two reference rows;

(8) joining corresponding reference sampling points in said two reference rows to generate plural continuous lines comprising straight lines, polygonal lines or curved lines; and (9) identifying sampling points in said one resolved row of the product groups (2) by comparison of said last-mentioned sampling points with said continuous lines to thus determine said base sequence of said DNA or DNA fragment.

6. The signal processing method in autoradiography as claimed in claim 5, including resolving on said support resolved rows of at least three sets of said specimens for synthesizing at least three reference where the rows of said first two resolved rows are closely spaced to each other as are the rows of said second two resolved rows.

7. The signal processing method in autoraddiography as claimed in claim 5 or 6, wherein the sampling points are detected by at least smoothing or threshold-processing the digital signal on each scanning line for the resolved rows respectively.

8. The signal processing method in autoradiography as claimed in claim 5 or 6, wherein each set of specimens for synthesizing a reference row consists essentially of two groups of mixtures of base specific cleavage products including:

(1) guanine specific cleavage products and adenine specific cleavage products; and (2) thymine specific cleavage products and cytosine specific cleavage products.

9. A signal processing method in autoradiography for determination of the base sequence of DNA or a DNA fragment, employing radioactively labeled cleavage products obtained by specifically cleaving the DNA or DNA fragment labeled with a radioactive element, comprising the steps of:

(1) providing at least one set of a reference mixture consisting essentially of guanine specific cleavage products, adenine specific cleavage products, thymine specific cleavage products and cytosine specific cleavage products;

(2) providing at leat one set of a specimen for synthesizing a reference row, the set comprising at least two groups of cleavage products or a mixture thereof, where the two groups in combination totally include guanine specific cleavage products, adenine specific cleavage products, thymine specific cleavage products and cytosine specific cleavage products;

(3) providing at least one group of cleavage products or a mixture thereof containing at least one kind of the base specific cleavage products;

(4) resolving the reference mixture provided in step (1), the specimen set provided in step (2), and the product group provided in step (3) one-dimensionally in such parallel relation that the resolved row of the reference mixture (1) and two or more of resolved rows of the specimen for synthesizing a reference row (2) sandwich at least one resolved row of the product group (3) to form at least four resolved rows on a support medium;

(5) obtaining an autoradiograph having locational information on groups of radioactively labeled cleavage products contained in said rows on the support medium;

(6) generating an electrical digital signal corresponding to said autoradiograph including said rows;

(7) detecting sampling points in each resolved row of the digital signal;

(8) assigning both the sampling points in a reference row corresponding to the resolved row of the reference mixture and the sampling points in a reference row synthesized from the two or more of resolved rows of the specimen to reference sampling points;

(9) joining the corresponding reference sampling points in said reference rows to generate plural continuous lines comprising straight lines, polygonal lines or curved lines; and (10) identifying said sampling points in said one resolved row of the product group (3) by comparison of said last mentioned sampling points with said continuous lines to thus determine said base sequence of said DNA or DNA fragment.

10. The signal processing method in autoradiography as claimed in claim 9, wherein at least three sets of resolved rows including a combination of a resolved row of the reference mixture (1) and two or more resolved rows of the specimen for synthesizing a reference row (2) are so provided on the support medium that said two resolved rows of the specimen are closely spaced and said resolved row of the reference mixture and the reference row (2) sandwich at least one resolved row of the product group (3).

11. The signal processing method in autoradiography as claimed in claim 9 or 10, wherein the sampling points are detected by smoothing or threshold-processing the digital signal on each scanning line for the plural resolved rows respectively.

12. The signal processing method in autoradiography as claimed in claim 9 or 10, wherein the set of specimens for synthesizing reference two (2) consists essentially of two groups of mixtures of base specific cleavage products including:

(1) guanine specific cleavage products and adenine specific cleavage products; and (2) thymine specific cleavage products and cytosine specific cleavage products.

* * * * *